United States Patent [19]

Heinrich

[11] Patent Number: 5,644,428
[45] Date of Patent: Jul. 1, 1997

[54] CONTINUOUSLY VARIABLE BEAM SPLITTER

[75] Inventor: Harley Kent Heinrich, Brewster, N.Y.

[73] Assignee: International Business Machines Corporation, Armonk, N.Y.

[21] Appl. No.: 25,501

[22] Filed: Mar. 3, 1993

[51] Int. Cl.$^6$ .............................. G02B 5/30; G02B 26/08; G02B 27/28

[52] U.S. Cl. .................... 359/494; 359/495; 359/497; 359/301; 359/304

[58] Field of Search ............................ 359/494, 495, 359/496, 497, 499, 500, 301, 304, 583, 483

[56] References Cited

U.S. PATENT DOCUMENTS

| | | | |
|---|---|---|---|
| 2,552,383 | 5/1951 | Rylsky et al. | 359/494 |
| 3,183,763 | 5/1965 | Koester | 359/497 |
| 3,391,972 | 7/1968 | Harris et al. | |
| 3,410,624 | 11/1968 | Schmidt. | |
| 3,432,238 | 3/1969 | Girard | 359/494 |
| 3,482,899 | 12/1969 | Schmidt. | |
| 3,511,556 | 5/1970 | Ammann. | |
| 3,520,592 | 7/1970 | Leib et al. | 359/500 |
| 3,536,375 | 10/1970 | Mansell. | |
| 3,572,895 | 3/1971 | Schmidt et al. | |
| 3,622,225 | 11/1971 | Buchman et al. | 359/583 |
| 3,704,997 | 12/1972 | Smith. | |
| 3,741,625 | 6/1973 | Saleh | 359/583 |
| 3,758,201 | 9/1973 | MacNeille | 359/497 |
| 4,129,357 | 12/1978 | Title. | |
| 4,563,058 | 1/1986 | Yardy | 359/583 |
| 4,588,263 | 5/1986 | Cohen et al. | 359/495 |
| 4,643,534 | 2/1987 | Chun et al. | 359/497 |
| 4,747,673 | 5/1988 | Marrs et al. | 359/583 |
| 4,758,092 | 7/1988 | Heinrich et al. | |
| 4,766,303 | 8/1988 | Yoshizumi et al. | 359/500 |
| 5,212,594 | 5/1993 | Joynes | 359/495 |
| 5,223,956 | 6/1993 | Kramer et al. | 359/495 |

OTHER PUBLICATIONS

B. R. Hemenway et al., "Optical Detection of Charge Modulation in Silicon Intergrated . . ." IEEE Electron Device Letters, vol. EDL-8, No. 8, Aug. 1987 pp. 344-346.

H.K. Heinrich et al. "Noninvasive Sheet Charge Density Probe For Integrated Silicon Devices" Appl. Phys. Lett. 48 (16), 21 Apr. 1986, pp. 1066-1068.

J. I. Thackara et al., "Electro-Optic Sampling of Poled Organic Media", Appl. Phys. Lett. 59 (10), 2 Sep. 1991, pp. 1159-1161.

H.K. Heinrich et al. "Measurement of Real-Time Digital Signals in a Silicon Bipolar Junction Transistor Using . . . ", Electron. Lett. 22, pp. 650-652, 1986.

R. Drougard et al. "New Polarization Interferometer for Fourier Analysis", J. Opt. Soc. Am. 55, pp. 1638-1642, 1965.

M. Francon et al. "Polarization Interferometers Applications in Microscopy and Macroscopy", Wiley-Interscience, J. Wiley & Sons, Ltd., pp. 24-25 and 40-43.

*Primary Examiner*—Ricky D. Shafer
*Attorney, Agent, or Firm*—Daniel P. Morris

[57] ABSTRACT

An optical beam splitter separates an input beam into two exit beams which angularly diverge from each other by a continuously variable amount. The degree of angular divergence is controlled by rotating a compound cylinder composed of a half-cylinder of birefringent material and a half-cylinder of glass about their common cylindrical axis. The cylinder is placed between a pair of plano-concave sections, which match the curvature and materials of the cylinder. The ordinary refractive index of the birefringent half-cylinder section is matched to that of the isotropic glass half-cylinder, which limits the changes in exit beam angular divergence to only one of the beams. A phase compensation block preceding the birefringent plano-concave section and the compound cylinder prevents the accumulation of optical phase between the two exit beams. The interfaces between the fixed birefringent plano-concave section and the birefringent half-cylinder as well as the glass half-cylinder and the fixed glass plano-concave sections are immersed in an index matching oil to minimize optical wavefront distortion at these interfaces.

19 Claims, 2 Drawing Sheets

CONTINUOUSLY VARIABLE BEAM SPLITTER

FIELD OF THE INVENTION

The present invention relates to a beam splitter for electromagnetic radiation, in particular for light. The beam splitter splits an incident beam into two output beams, the angle of divergence between which is continuously variable.

BACKGROUND OF THE INVENTION

A beam splitter is a commonly used element in optical apparatus. A beam splitter splits an incident beam into two output beams which diverge at a fixed angle. Other commonly used beam splitting prisms split an incident beam into two substantially parallel output beams such as described in the book of M. Francon, and S. Mallick, "Polarization Interferometers", Wiley-Interscience, 1971, pp. 25. However, these prisms have the disadvantage of the angle of separation between the two exit beams of the prism is fixed. Continuously variable beam splitters are described in the article of R. Drougard, and J. Wilczynski, "New Polarization Interferometer For Fourier Analysis", J. Opt. Soc. Am. 55, 1638 (1965) and in the book of M. Francon et al. at pages 40–42. However, the Drougard beam splitter requires complex matched counter rotation of two Wollaston prisms relative to a precisely-aligned, precision half-wave plate to avoid the generation of four exit beams from the variable beam splitter. This approach results in a variable beam splitter that is difficult to operate and that requires several expensive optical components.

Optical apparatus such as the optical apparatus described in U.S. Pat. No. 4,758,092 describes an apparatus and technique for probing dynamic sheet charged density variations in an integrated semiconductor device. This apparatus uses a beam splitting prism in a phase-contrast interferometer which optically detects the electrical signals in a functioning electronic circuit. The operation of such an apparatus can be substantially enhanced by a simple to use continuously variable beam splitter. The teaching of U.S. Pat. No. 4,758,092 is incorporated herein by reference.

SUMMARY OF THE INVENTION

It is an object of the present invention to provide an improved continuous variable beam splitter.

It is another object of the present invention to provide a continuously variable beam splitter having a simple non-complex mechanical motion.

It is yet another object of the present invention

A broad aspect of the present invention is an optical apparatus for splitting a beam into two diverging beams wherein the angle between the two diverging beams is continuously variable.

The optical apparatus has an input subsystem and an output subsystem. The input subsystem splits the incident beam into a first and second component.

The output subsystem causes the first and second components to diverge at a continuously variable angle.

In a more particular aspect of the present invention, the optical apparatus has an input subsystem which separates an incident normally polarized beam into two colinear components having orthogonal polarization.

In another more particular aspect of the present invention, the input subsystem is formed from a first and second block of birefringent material. The first and second blocks have the crystal axis orthogonally oriented with respect to each other.

In another more particular aspect of the present invention, the output of the input subsystem has a concave cylindrical surface which matches a convex cylindrical surface on the output subsystem.

In another more particular aspect of the present invention, the apparatus has an output subsystem formed from a cylindrical optical element.

In another more particular aspect of the present invention, the cylindrical optical element is formed from two semicylinders adhesively attached along the plane surfaces of the semicylinder. One semicylinder is a birefringent material and the other is nonbirefringent material.

In another more particular aspect of the present invention, at the interface of the semicylinders the incident beam is split into two beams diverging at an angle.

The angle is determined by the relative angle between the semicylinder plane surface and the incident beam.

BRIEF DESCRIPTION OF THE DRAWINGS

These and other objects, features and advantages of the present invention will become apparent upon consideration of the following detailed description of the invention when read in conjunction with the figures in which.

DETAILED DESCRIPTION

Figure 1:
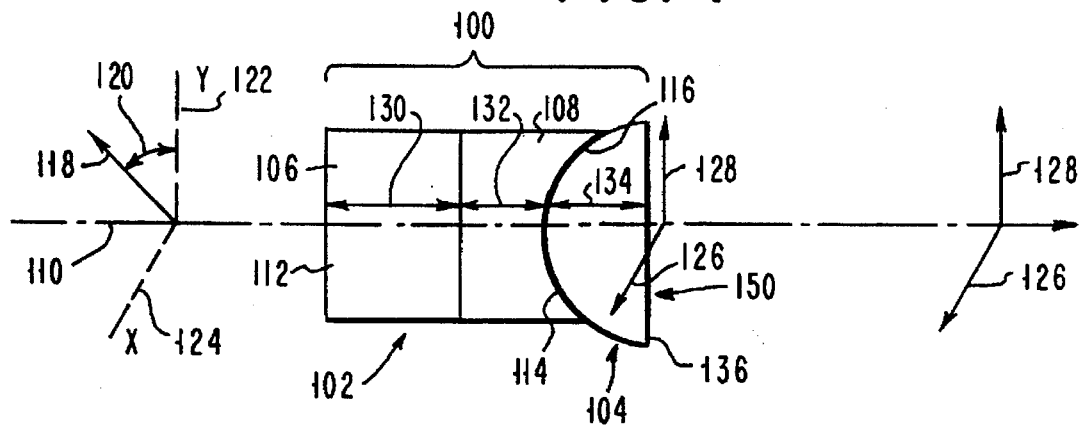
FIGS. 1, 2 and 3 schematically shows the basic structure of the apparatus of the present invention.
Figure 2:
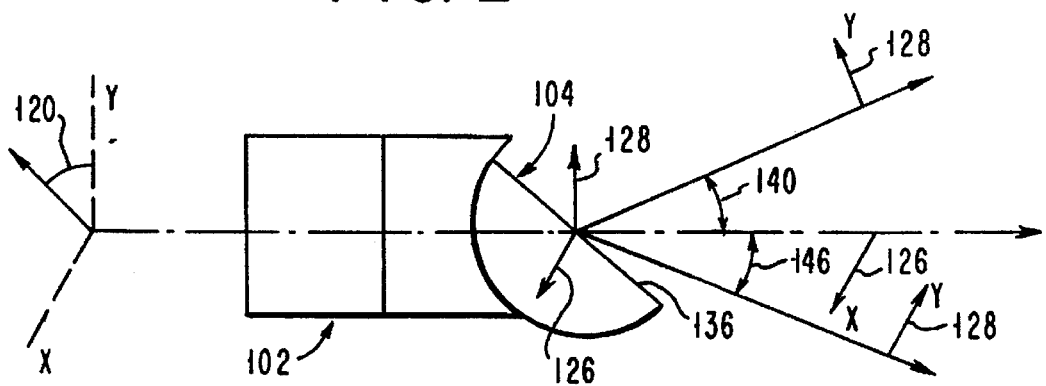
Figure 3:
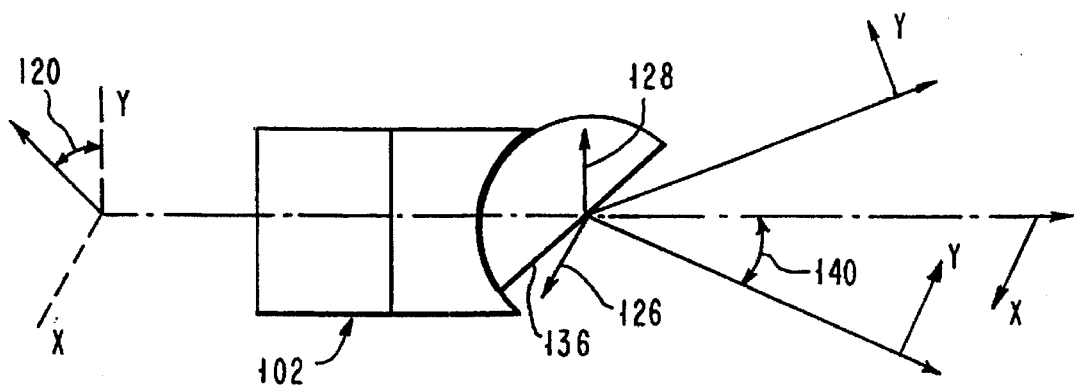

FIGS. 1, 2 and 3 schematically show a side view of the basic structure of the apparatus of the present invention. Apparatus 100 has an input subsystem 102 and output subsystem 104. Input subsystem 102 is composed of a first part 106 and a second part 108. The first and second parts are formed from a birefringent material. The principal axis of the first and second parts are nonparallel and are preferably orthogonal. Part 108 has a concave output surface 114. Output subsystem 104 has a convex surface 116 which is adapted for slidable engagement with surface 114. The radius of concave surface 114 is the same as convex surface 116. Between surfaces 114 and 116 there is a fluid having the same index of refraction as the normal index of refraction of part 108 and subsystem 104, which permits surface 114 to slide with respect to surface 116. Part 104 is birefringent and has the same principal axis as part 108. Incident beam 110 has polarization 118 which is at angle 120 (preferably 45°) with respect to y-axis 122. Birefringent part 106 splits incident beam 110 into two colinear beams having a polarization along x-axis 124 and y-axis 122. The phase of the x and y polarizations is changed by part 106. The orientation of the principal axis of part 108 and subsystem 104 is so that the phase difference is reversed. Therefore, the x polarized output beam 126 and the y-polarized output beam 128 have the same phase. If part 106, part 108 and subsystem 104 are of the same birefringent material, to achieve equal phase at the output, distance 130 is equal to the sum of radius 134 and distance 132. Subsystem 104 is in the shape of a semicylinder having planar surface 136. When planar surface 136 is perpendicular to incident beam 110, beams 128 and 126 are not deviated from the direction of the incident beam. When surface 136 is not perpendicular to the direction of the incident beam 110 y-polarized beam 128 is deviated from the direction of the incident beam as shown in FIGS. 2 and 3 by angle 140 which is continuously variable to the direction of incident beam 110. The x-polarized beam 126 is not deviated if the ordinary index of refraction of output subsystem 104 is the same as the index of refraction of region 150 outside of surface 136.

Figure 4:
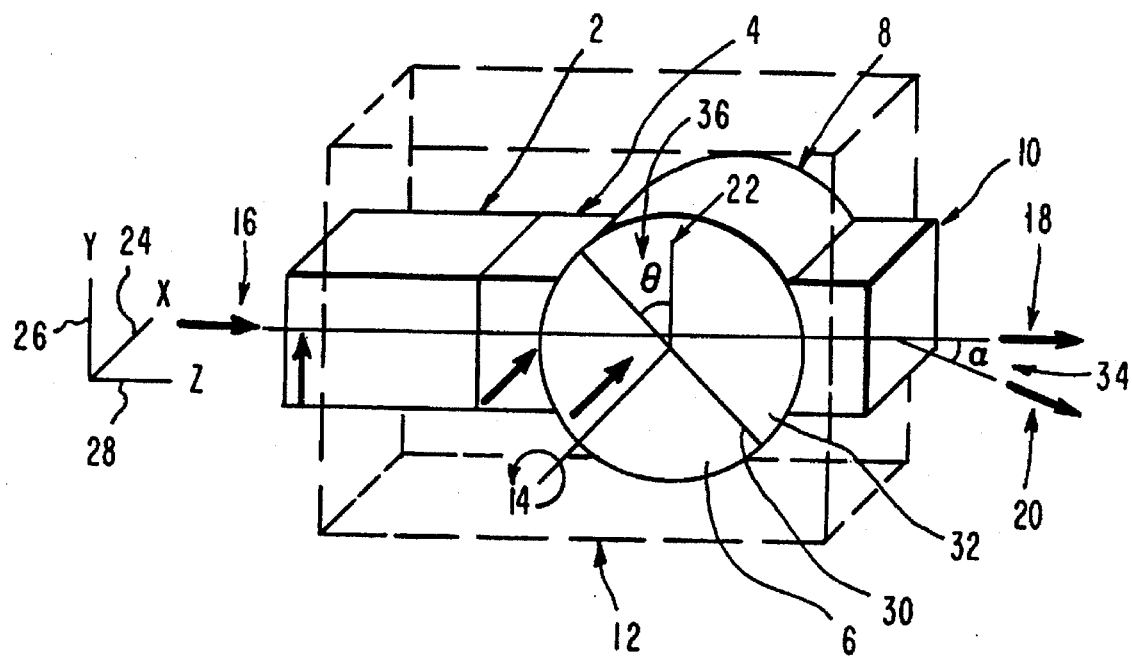
FIG. 4 shows a specific embodiment of the apparatus according to the present invention.

FIG. 4 shows a perspective diagram a specific embodiment of the continuously variable beam splitter according to the present invention. A cylinder composed of two sections, 6,8 is rotated about its axis 14. This action varies the angle of the interface between the birefringent portion 6 and the glass portion 8 of the cylinder. By matching the refractive index of the glass portion of the cylinder 8 to the ordinary refractive index of the birefringent portion of the cylinder 6, light polarized along the x-axis 24 is not refracted at this interface 30. However, light polarized along the y-axis 26 will see a refractive index change at the interface between the birefringent 6 and glass 8 sections of the cylinder. Therefore, input light 16 polarized along the x-axis 24 will exit the variable beam splitter undeviated 18, while input light 16 polarized along the y-axis 26 will exit the variable beam splitter 20 with a slight divergence angle, $\alpha$, 34.

Input light 16 to the variable beam splitter is polarized at 45 degrees to the x-axis in the x-y plane. This light travels through the birefringent material of section 2, which may be made of quartz. The y polarized portion of the input light travels at a phase velocity of $c/n_e$, while light polarized along the x-axis travels with a phase velocity of $c/n_o$, where c is the speed of light in a vacuum, and $n_e$ and $n_o$ are the extraordinary and ordinary indices of refraction respectively. After traveling through section 2, the x and y polarized portions of the input beam will have accumulated a phase difference of $\Delta\phi_2 = (n_e - n_o)l_2$, where $l_2$ is the length of section 2 along z-axis 28. Similarly, as the two polarizations travel through sections 4 and 6, the x and y polarizations will accumulate a phase difference between them of $$\Delta\phi_{4,6} = (n_o - n_e)(l_4 + l_6),$$

where $l_4$ is the minimum thickness of section 4 and $l_6$ is the radius of the half-cylinder 6. Notice that if $l_2 = l_4 + l_6$, the accumulated phase difference between the x and y polarizations will be zero. At the interface 30 between cylindrical sections 6 and 8, the x and y polarizations will refract differently. Since the ordinary refractive index along x-axis 24 of section 6 matches the isotropic refractive index of section 8, the x polarization will not refract at this interface. And hence, it will travel through the cylindrical section 8 and the plano-concave section 10 undeviated. However, the y polarized light will see a refractive index change of $n_e - n_o$ at the interface 30 between sections 6 and 8. Hence, this polarization will refract by an amount given by $$\sin\alpha = n_o \sin\left[\sin^{-1}\left(\frac{n_e}{n_o}\sin\theta\right) - \theta\right],$$

where $\theta$, 36, is the angle that the cylinder, composed of section 6 and 8, has been rotated about its axis 14 relative to a vertical reference plane 22, and angle $\alpha$, 34, is the divergence angle between the two exit beams 18 and 20. For small values of the birefringence, the exit angle $\alpha$ is approximately given by $$\alpha = \Delta n \theta,$$

where $\Delta n = n_e - n_o$. The concave 32 face of section 10 has a matching curvature to the half-cylinder section 8 and both sections are made of the same material, which may be Hoya FEL-1 glass. Sections 8 and 10 provide an index matched glass path from the beam splitting interface 30 to the outside of the matching oil bath 12 to minimize the effect of optical inhomogenetities and thermal blooming that would otherwise occur in the index matched bath.

The continuously variable beam splitter, according to the present invention, can be used as beam splitter 14 of FIG. 1 of U.S. Pat. No. 4,758,092 incorporated herein by reference above.

A partial list of the birefringent materials from the Handbook of Optics, W. G. Driscoll, McGraw-Hill, p. 10–107 useful to practice the present invention are:

Quartz
Calcite
Rutile (Titanium Dioxide)
Cadmium Selenide
Magnesium Flouride
Cadmium Sulfide
Apophyllite
Zinc Sulfide
Lithium Niobate
Barium Titanate
ADP
AD*P
KDP
KD*P
Sapphire
Mica In summary, the present invention relates to a beam splitter for electromagnetic radiation, in particular for light. The beam splitter splits an incident beam into two output beams, the angle of divergence between which is continuously variable.

What is claimed is:

1. An apparatus for splitting an incident electromagnetic beam into two beams diverging at a continuously variable angle comprising:

an input subsystem;

an output subsystem;

said incident beam has a first polarization;

said input subsystem splits said incident beam into a first component and a second component;

said output subsystem is rotatable with respect to said input subsystem to cause said first and second components to diverge as said two beams at said continuously variable angle;

said input subsystem comprises a first layer of birefringent material and a second layer of birefringent material, the principal axis of said first layer being nonparallel to the principal axis of said second layer.

2. An apparatus according to claim 1, wherein said first component has a first polarization and said second component has a second polarization.

3. An apparatus according to claim 1, wherein said first component and said second component have orthogonal polarizations.

4. An apparatus according to claim 1, wherein said first component and said second component are colinear.

5. An apparatus according to claim 1, wherein said principle axis of said first layer is orthogonal to the principle axis of said second layer.

6. An apparatus according to claim 1, wherein said first layer and said second layer are formed from a material selected from the group consisting of Quartz, Calcite, Rutile (Titanium Dioxide), Cadmium Selenide, Magnesium Flouride, Cadmium Sulfide, Apophyllite, Zinc Sulfide, Lithium Niobate, Barium Titanate, ADP, AD*P, KDP, KD*P, Sapphire and Mica.

7. An apparatus according to claim 1, wherein said input subsystem has a concave output end.

8. An apparatus according to claim 1, wherein said output subsystem comprises a birefringent material.

9. An apparatus according to claim 1, wherein all elements of said input subsystem are fixed with respect to each other and all elements of said output subsystem are fixed with respect to each other, said angle is continuously variable by the single rotation of said input subsystem with respect to said output subsystem.

10. An apparatus for splitting an incident electromagnetic beam into two beams diverging at a continuously variable angle comprising:
   an input subsystem;
   an output subsystem;
   said incident beam has a first polarization;
   said input subsystem generates from said incident beam a first component and a second component;
   said output subsystem is rotatable with respect to said input subsystem to cause said first and second components to diverge as said two beams at said continuously variable angle;
   said output subsystem comprises a cylinder of a first semicylinder formed from a birefringent material and a second semicylinder of an isotropic material.

11. An apparatus according to claim 10, wherein said birefringent material is selected from the group consisting of Quartz, Calcite, Rutile (Titanium Dioxide), Cadmium Selenide, Magnesium Flouride, Cadmium Sulfide, Apophyllite, Zinc Sulfide, Lithium Niobate, Barium Titanate, ADP, AD*P, KDP, KD*P, Sapphire and Mica.

12. An apparatus according to claim 10, wherein said isotropic material is index matched to the ordinary index of refraction of the said first semicylinder.

13. An apparatus for splitting an incident electromagnetic beam into two beams diverging at a continuously variable angle comprising:
   an input subsystem;
   an output subsystem;
   said input subsystem generates from said incident beam a first component and a second component;
   said output subsystem is rotatable with respect to said input subsystem to cause said first and second components to diverge said two beams at said continuously variable angle; and
   said input subsystem comprises a first layer of birefringent material having a first principal axis disposed in contact with a second layer of birefringent material having a second principal axis, said first principal axis being nonparallel to said second principal axis, said second layer has a concave surface, said output subsystem has a first semicylinder adapted for sliding engagement with said concave surface.

14. An apparatus according to claim 13, wherein said output system further includes a second semicylinder, said first semicylinder is formed from a birefringent material having a third principal axis, said second semicylinder is formed from a nonbirefringent material, wherein said first and second semicylinder form a cylinder.

15. An apparatus, according to claim 14, wherein said third principal axis is aligned with the principal axis of said second layer.

16. An apparatus according to claim 14, wherein said first layer has a first thickness, said second layer has a second thickness and said cylinder has a radius, said first thickness equals the sum of said second thickness and said radius.

17. An apparatus for splitting an incident electromagnetic beam into two beams diverging at a continuously variable angle comprising:
   an input subsystem;
   an output subsystem;
   said incident beam has an input polarization
   said input subsystem splits said incident beam into a first component and a second component, said first component has a first polarization, said second component has a second polarization;
   said output subsystem is rotatable with respect to said input subsystem to cause said first and second components to diverge as said two beams at said continuously variable angle;
   said input subsystem comprises: a first layer of a birefringent material having a first principle axis and a first thickness, said first layer is disposed in contact with a second layer of birefringent material having a second principal axis and a second thickness, said second layer has a first concave surface, said first principal axis is nonparallel to said second principal axis;
   said output subsystem comprising: a cylinder having a radius, said cylinder being formed from a first semicylinder and a second semicylinder disposed in contact along a planar interface, said first semicylinder is formed from a birefringent material having a third axis, said third axis is substantially parallel to said second principal axis;
   said first thickness is substantially equal to the sum of said second thickness and said radius;
   a layer of nonbirefringent material having a second concave surface; said cylinder is rotatable disposed between said first concave surface and said second concave surface, so that when said cylinder is rotated said angle between said two diverging beams is varied.

18. An optical apparatus according to claim 17, wherein said input subsystem separates said incident beam into said first component having a first polarization and said second component having a second polarization.

19. An optical apparatus of claim 18, wherein said first thickness being substantially equal to said sum of said second thickness and said radius provides the same optical path length to said first component and said second component.

* * * * *